(12) United States Patent
Chen

(10) Patent No.: US 6,557,878 B2
(45) Date of Patent: May 6, 2003

(54) LOCKING DEVICE FOR RELEASABLY LOCKING A SEAT POST RELATIVE TO A SEAT TUBE OF A BICYCLE FRAME

(75) Inventor: Jack Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 30 days.

(21) Appl. No.: 09/790,771

(22) Filed: Feb. 22, 2001

(65) Prior Publication Data

US 2002/0113403 A1 Aug. 22, 2002

(51) Int. Cl.7 .................................................. B62M 1/00
(52) U.S. Cl. ............................. 280/226.1; 297/344.12
(58) Field of Search .................. 280/226.1; 297/344.12, 297/344.18; 403/302, 309, 344

(56) References Cited

U.S. PATENT DOCUMENTS

| | | | | |
|---|---|---|---|---|
| 4,561,668 A | * | 12/1985 | Klopfenstein | 280/226 R |
| 4,957,388 A | * | 9/1990 | Liu | 403/344 |
| 5,056,196 A | * | 10/1991 | Van Walraven | 24/279 |
| 5,193,930 A | * | 3/1993 | Chi | 403/24 |
| 5,224,396 A | * | 7/1993 | Lobbezoo et al. | 74/551.3 |
| 5,318,375 A | * | 6/1994 | Entrup et al. | 403/359 |
| 5,408,900 A | * | 4/1995 | Marui | 74/551.4 |
| 5,738,326 A | * | 4/1998 | Liao | 248/405 |
| 5,927,810 A | * | 7/1999 | Liao | 297/344.12 |
| 6,158,751 A | * | 12/2000 | Wu et al. | 280/87.041 |

* cited by examiner

Primary Examiner—Lesley D. Morris
Assistant Examiner—L. Lum
(74) Attorney, Agent, or Firm—Harness, Dickey & Pierce, P.L.C.

(57) ABSTRACT

A locking device is adapted for releasably locking a seat post relative to a seat tube of a bicycle frame, and includes a tubular body with a lower surrounding member to be secured to the seat tube. An upper surrounding member extends upwardly to terminate at an upper surrounding edge, and has an accommodating space for the seat post, and a slit extending downwardly from the upper surrounding edge. A plurality of protuberances are disposed on and project radially and inwardly of an inner surrounding wall surface of the upper surrounding member, and are angularly displaced from each other. Right and left jaw members are respectively attached on the upper surrounding member, and are moved by a tightening member toward each other to narrow the slit so as to bring the protuberances to abut against the seat post.

5 Claims, 4 Drawing Sheets

6,557,878 B2

LOCKING DEVICE FOR RELEASABLY LOCKING A SEAT POST RELATIVE TO A SEAT TUBE OF A BICYCLE FRAME

BACKGROUND OF THE INVENTION

1. Field of the Invention

This invention relates to a device for locking a seat post relative to a seat tube of a bicycle frame, more particularly to a locking device for releasably locking the seat post on the seat tube.

2. Description of the Related Art

A conventional locking device for locking a seat post on a seat tube of a bicycle frame includes a flexible tubular member which can be wrapped tightly around the seat post and which can be inserted into the seat tube. The seat tube has a slit which extends downwardly from an upper surrounding edge thereof. A C-shaped clamp ring is wrapped around the seat tube, and includes two jaw portions which are spaced apart from each other and which have through holes such that a quick-release fastener can pass through the through holes to engage a screw nut at one end thereof, and to be turnable at an opposite end thereof to bring the jaw portions towards each other so as to narrow the slit, thereby tightening the position of the flexible tubular member relative to the seat tube. However, the position of the flexible tubular member relative to the seat tube is not sufficiently firm. In addition, friction between the flexible tubular member and the seat tube remains even when the quick-release fastener is released, thereby resulting in inconvenience during height adjustment of the seat post relative to the seat tube.

SUMMARY OF THE INVENTION

The object of the present invention is to provide a locking device which can tighten firmly a seat post relative to a seat tube of a bicycle frame, and which permits a convenient height adjustment of the seat post relative to the seat tube.

According to this invention, the locking device includes a tubular body which has a lower surrounding member adapted to be secured to a seat tube of a bicycle frame, and an upper surrounding member extending upwardly in an axial direction from the lower surrounding member to terminate at an upper surrounding edge. The upper surrounding member has an outer surrounding wall surface, an inner surrounding wall surface which is opposed to the outer surrounding wall surface in radial directions and which confines an accommodating space to accommodate a seat post via insertion therein from the upper surrounding edge, and a slit which extends downwardly from the upper surrounding edge towards the lower surrounding member. The outer surrounding wall surface includes right and left lateral edge portions which are spaced apart from each other in a transverse direction relative to the axial direction to define the slit. A plurality of protuberances are disposed on the inner surrounding wall surface, and are angularly displaced from each other. Each protuberance projects radially and inwardly of the inner surrounding wall surface so as to abut against the seat post when the seat post is received in the accommodating space. Right and left jaw members are respectively attached on the right and left lateral edge portions, and are movable toward each other in the transverse direction to narrow the slit so as to bring the protuberances to abut against the seat post. A tightening member is disposed to releasably move the right and left jaw members toward each other in the transverse direction.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
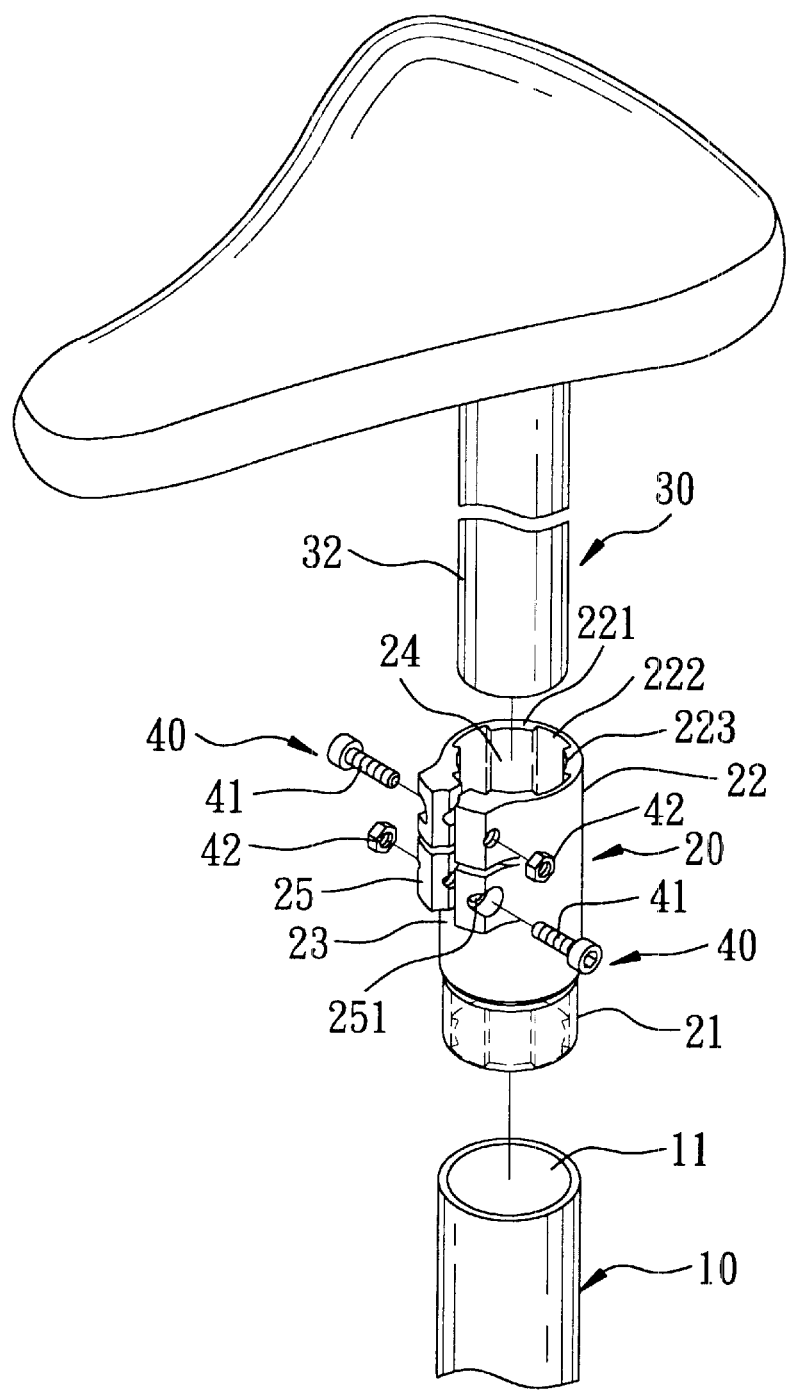
FIG. 1 is an exploded perspective view of a first preferred embodiment of a locking device according to this invention when incorporated with a seat post and a seat tube of a bicycle frame.

Before the present invention is described in greater detail, it should be noted that same reference numerals have been used to denote like elements throughout the specification.

Figure 2:
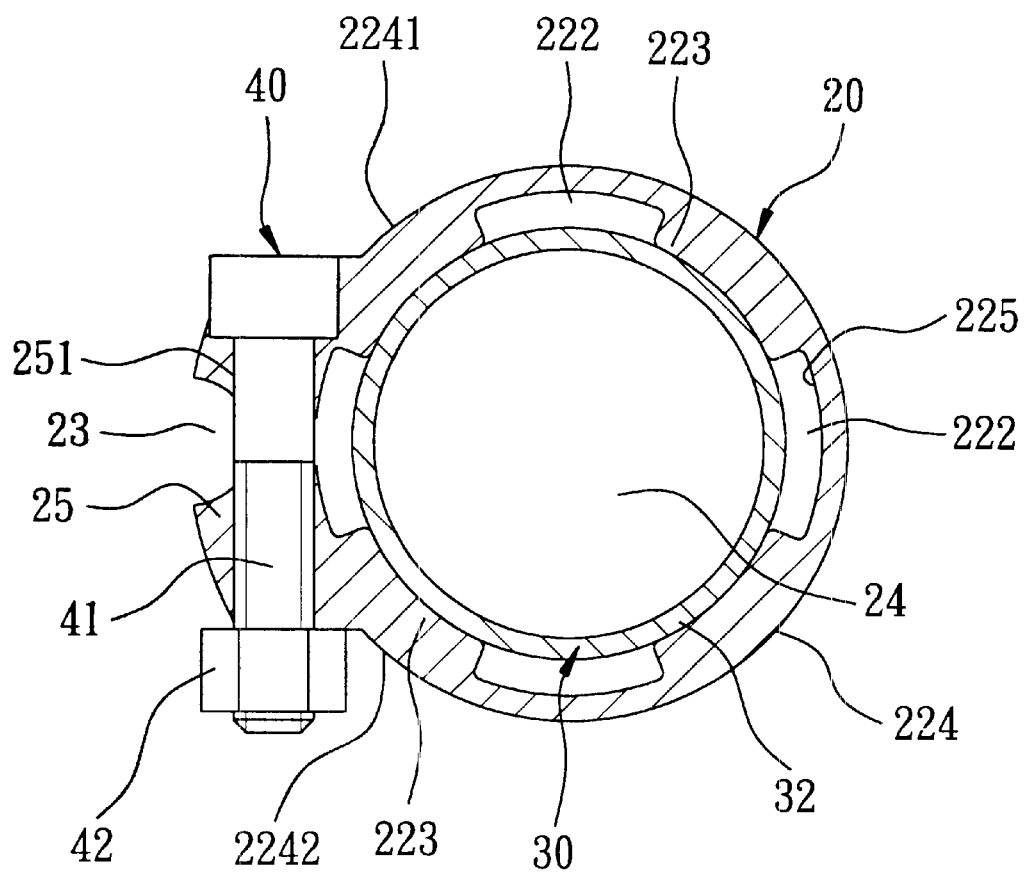
FIG. 2 is a cross-sectional view showing how the first preferred embodiment locks the seat post on the seat tube.

Referring to FIGS. 1 and 2, the first preferred embodiment of the locking device according to the present invention is shown to comprise a tubular body 20 with a lower surrounding member 21 and an upper surrounding member 22. The lower surrounding member 21 is adapted to be inserted into an upper opening 11 of a seat tube 10 of a bicycle frame and to be secured to the seat tube 10 by welding. The upper surrounding member 22 extends upwardly in an axial direction from the lower surrounding member 21, and terminates at an upper surrounding edge 221. The upper surrounding member 22 has an outer surrounding wall surface 224, and an inner surrounding wall surface 225 which is opposite to the outer surrounding wall surface 224 in radial directions and which confines an accommodating space 24 so as to accommodate a seat post 32 of a seat 30 via insertion therein from the upper surrounding edge 221. A slit 23 extends downwardly from the upper surrounding edge 221 towards the lower surrounding member 21. The outer surrounding wall surface 224 includes right and left lateral edge portions 2241, 2242 which are spaced apart from each other in a transverse direction relative to the axial direction to define the slit 23. Right and left jaw members 25 are formed respectively and integrally on the right and left lateral edge portions 2241, 2242. Each of the right and left jaw members 25 has two through holes 251. Each through hole 251 in the right jaw member 25 is aligned with a respective one of the through holes 251 in the left jaw member 25 in the transverse direction. Thus, when the seat post 32 is received in the accommodating space 24, each screw bolt 41 of a pair of tightening members 40 can pass through the aligned through holes 251 and engage threadedly a screw nut 42 so as to bring the right and left jaw members 25 towards each other, thereby narrowing the slit 23. The upper surrounding member 22 further has a plurality of protuberances 223 which are disposed on the inner surrounding wall surface 225 and which are angularly displaced from each other so as to confine concavities 222 thereamong. Each protuberance 223 projects radially and inwardly of the inner surrounding wall surface 225 so as to abut tightly against the seat post 32 when the right and left jaw members 25 are brought to be closer to each other by means of the tightening members 40.

As such, the seat post 32 can be positioned tightly and uniformly relative to the seat tube 10 by means of the protuberances 223 without the provision of a tubular coupling member as required in the conventional locking device, thereby eliminating the problem resulting from use of the tubular coupling member.

Figure 3:
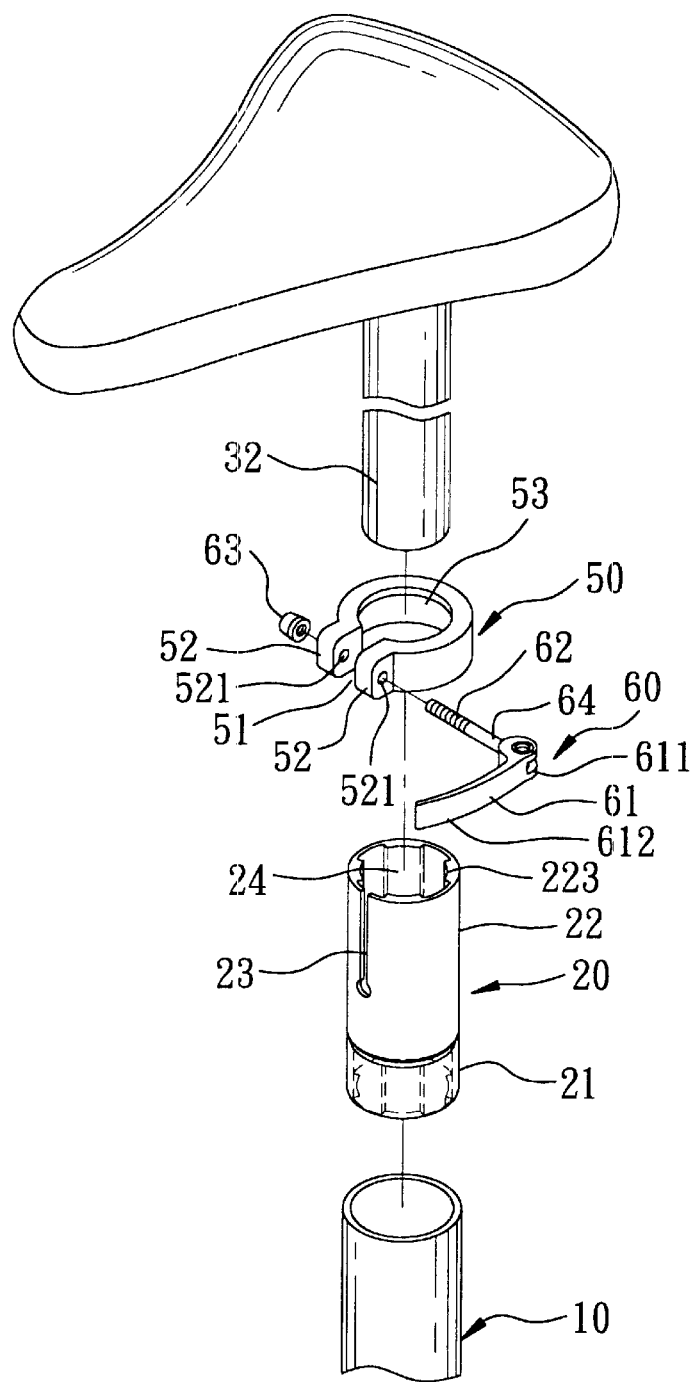
FIG. 3 is an exploded perspective view of a second preferred embodiment of the locking device according to this invention when incorporated with the seat post and the seat tube.

Referring to FIG. 3, the second preferred embodiment of the locking device according to this invention is shown to be similar to the first preferred embodiment in construction, and includes a tubular body 20 with a lower surrounding member 21 that is secured to the seat tube 10, and an upper surrounding member 22 that has a slit 23 formed therein and a plurality of protuberances 223 projecting radially and inwardly of an inner surrounding wall surface thereof. The difference resides in that right and left jaw members 52 are formed separately from the upper surrounding member 22. A C-shaped connecting member 53 interconnects and cooperates with the right and left jaw members 52 to form a clamp member 50 in a single piece construction, and has the right and left jaw members 52 spaced apart from each other by a slot 51. The connecting member 53 has an inner diameter which is somewhat smaller than the outer diameter of the upper surrounding member 22 so as to wrap around the latter. A quick-release fastener 60 has a threaded end portion 62 which passes through two through holes 521 in the jaw members 52 and which engages threadedly a screw nut 63 to have the screw nut 63 abutting against the right jaw member 52, a shank end portion 64 which extends outwardly of the left jaw member 52 from the threaded end portion 62, and an actuating member 61 which has a proximate end 611 that is mounted pivotally on the shank end portion 64, and a distal end that is disposed opposite to the proximate end 611 and that is turnable relative to the shank end portion 64 between a tightening position, where the proximate end 611 depresses the left jaw member 52 to bring the left jaw member 52 closer to the right jaw member 52, thereby tightening the seat post 32 in the accommodating space 24 of the upper surrounding member 22, and a loosening position, where the proximate end 611 engages loosely the left jaw member 52 so as to release the seat post 32 for facilitating adjustment of the same.

Figure 4:
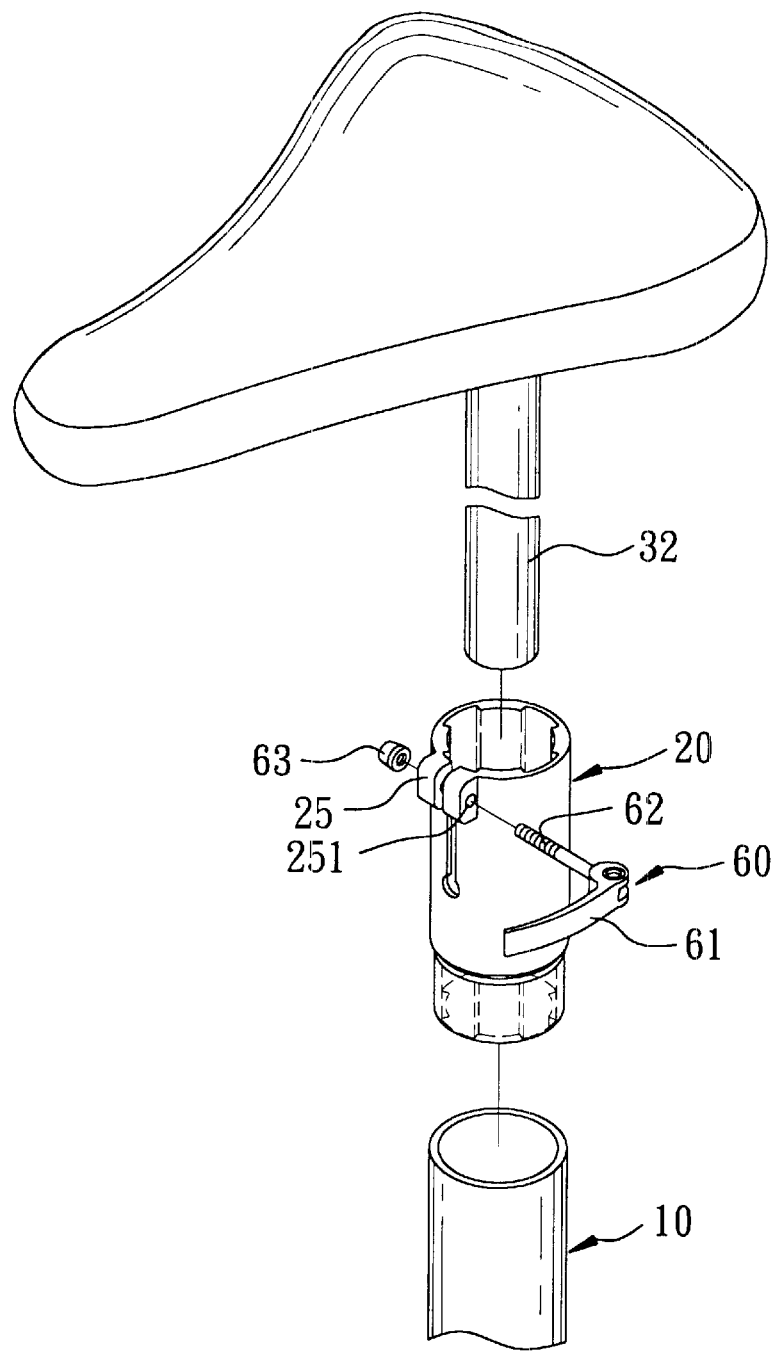
FIG. 4 is an exploded perspective view of a third preferred embodiment of the locking device according to this invention when incorporated with the seat post and the seat tube.

The third preferred embodiment of the locking device according to this invention is shown in FIG. 4 to include a tubular body 20 similar to that of the first preferred embodiment, except that only one through hole 251 is formed in each of right and left jaw members 25. A quick-release fastener 70, similar to that of the second preferred embodiment, has a threaded end portion which passes through the through holes 251 and which engages threadedly a screw nut 63, and an actuating member 61 which is turnable so as to tighten and loosen the seat post 32 in the tubular body 20.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A locking device adapted to releasably lock a seat post relative to a seat tube if a bicycle frame, comprising:
   a tubular body including
   a lower surrounding member adapted to be secured to the seat tube, and
   an upper surrounding member extending upwardly in an axial direction from said lower surrounding member, terminating at an upper surrounding edge, and having an outer surrounding wall surface, an inner surrounding wall surface opposite to said outer surrounding wall surface in radial directions and confining an accommodating space of such a dimension as to accommodate the seat post via insertion therein from said upper surrounding edge, and a slit extending downwardly from said upper surrounding edge towards said lower surrounding member, and outer surrounding wall surface including right and left lateral edge portions which are spaced apart from each other in a transverse direction relative to the axial direction to define said slit, said upper surrounding member further having a plurality of protuberances disposed on said inner surrounding wall surface and angularly displaced from each other, each of said protuberances extending axially and projecting radially and inwardly of said inner surrounding wall surface so as to be adapted to abut against the seat post when the seat post is received in said accommodating space;
   right and left jaw members respectively attached on said right and left lateral edge portions, and movable toward each other in the transverse direction to narrow said slit so as to bring said protuberances to abut against the seat post; and
   a tightening member disposed to releasably move said right and left jaw members toward each other in the transverse direction.

2. The locking device of claim 1, wherein said tightening member includes a pair of through holes formed respectively in said right and left jaw members and aligned with each other in the transverse direction, a screw nut, and a screw bolt disposed to pass through said through holes and engage threadedly said screw nut so as to bring said right and left jaw members towards each other.

3. The locking device of claim 2, wherein said screw bolt includes a threaded end portion threadedly engaging said screw nut to have said screw nut abutting against said right jaw member, and a shank end portion extending outwardly of said left jaw member from said threaded end portion, said tightening member further including an actuating member having a proximate end which is mounted pivotally on said shank end portion, and a distal end which is disposed opposite to said proximate end and which is turnable relative to said shank end portion between a tightening position, where said proximate end depresses said left jaw member to bring said left jaw member closer to said right jaw member, and a loosening position, where said proximate end engages loosely said left jaw member.

4. The locking device of claim 1, wherein said right and left jaw members are integrally formed with said right and left lateral edge portions.

5. The locking device of claim 1, further comprising a C-shaped connecting member interconnecting said right and left jaw members in a single piece construction, and wrapped around said outer surrounding wall surface.

* * * * *